(12) United States Patent
Czako

(10) Patent No.: US 6,229,523 B1
(45) Date of Patent: May 8, 2001

(54) DIGITAL VERSATILE DISC PLAYBACK SYSTEM WITH EFFICIENT MODIFICATION OF SUBPICTURE DATA

(75) Inventor: Brian M. Czako, Boynton Beach, FL (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/025,354

(22) Filed: Feb. 18, 1998

(51) Int. Cl.$^7$ ....................................................... G09G 5/02
(52) U.S. Cl. .......................... 345/150; 345/153; 345/186; 345/199; 345/509; 345/203
(58) Field of Search ................................ 345/150, 152, 345/153, 501, 507, 186, 510, 509, 188, 515, 193, 199, 514, 902, 967, 977, 203

(56) References Cited

U.S. PATENT DOCUMENTS

| | | | |
|---|---|---|---|
| 4,857,901 | * 8/1989 | Lathrop | 345/188 |
| 4,874,164 | * 10/1989 | Miner et al. | 345/509 |
| 5,113,517 | * 5/1992 | Beard et al. | 703/23 |
| 5,235,677 | * 8/1993 | Needle et al. . | |
| 5,473,342 | * 12/1995 | Tse et al. | 345/132 |
| 5,502,462 | * 3/1996 | Mical et al. | 345/185 |
| 5,594,473 | * 1/1997 | Miner et al. | 345/199 |
| 5,650,941 | * 7/1997 | Coelho et al. | 395/133 |
| 5,664,226 | * 9/1997 | Czako et al. | 710/52 |
| 5,838,389 | * 11/1998 | Mical et al. . | |
| 5,844,569 | * 12/1998 | Eisler et al. | 345/433 |
| 5,893,095 | * 4/1999 | Jain et al. | 707/6 |
| 5,915,250 | * 6/1999 | Jain et al. | 707/100 |
| 5,936,606 | * 8/1999 | Lie . | |

* cited by examiner

Primary Examiner—Richard Hjerpe
Assistant Examiner—Henry N. Tran
(74) Attorney, Agent, or Firm—Kudirka & Jobse, LLP

(57) ABSTRACT

In a display system having a predefined number, n, of pixel types, a display processor, such as a digital versatile disc (DVD) display processor, includes a color palette which can store more than n color/contrast values and a subpicture bitmap composed of subpicture pixel values, each of which corresponds to one of the n pixel types. In a DVD display system, for example, the DVD subpicture pixel types are: Background, Pattern, Emphasis 1, and Emphasis 2. Each subpicture pixel value is, in turn, related to a color/contrast combination by the color palette, with each pixel value corresponding to the address of a palette location. The corresponding palette location contains the color/contrast value for the related subpicture pixel type. To modify the color/contrast value of a selected group of the pixels having one of the four DVD subpicture pixel types, the display processor updates the color palette, associating new color/contrast values with previously "unused" palette locations. Additionally, pixel values within the bitmap locations which are to have their color/contrast values changed are modified to correspond to the address of the color palette location containing the "new" color/contrast value. The display processor sends the updated color palette and bitmap to a video processor which combines the color palette information, bitmap information and video information to create a subpicture display which reflects the updated color/contrast values.

22 Claims, 5 Drawing Sheets

DIGITAL VERSATILE DISC PLAYBACK SYSTEM WITH EFFICIENT MODIFICATION OF SUBPICTURE DATA

FIELD OF THE INVENTION

This invention relates generally to improvements in digital versatile disc systems and, more particularly, to an improved system for modifying digital versatile disc subpicture data.

BACKGROUND OF THE INVENTION

Digital versatile discs (DVDs) are information storage devices used for storing prerecorded audio information, movies and computer software. The storage and playback mechanism used in DVDs closely resembles the mechanism used in compact discs (CDS) and DVD players and software use the same laser technology as CD players. Briefly, both DVDs and CDS store information as a pattern of pits formed in a metallic substrate. The pit patterns form digital words and can be read by shining a laser beam on the disc surface and detecting the reflected beam. However, the information storage capacity of a typical DVD is much higher than a CD. Presently available DVDs have a variety of capacities which depend on the technology used to manufacture the discs. Single-layer technologies can be either single or double-sided with capacities of 4.7 gigabytes and 9.4 gigabytes, respectively. Dual layer technologies will soon be available which use single or double sided capacities that hold approximately 8.5 gigabytes per side. This high information storage capacity makes DVDs suitable for storing not only audio information, but also video information and large amounts of computer data as well.

DVD players have many CD player features, such as the ability to play selections in any order desired and the ability to read information from any point on the disc. However, DVDs can store information in several formats. For example, DVDs which are used to store video information (hereinafter called DVD-VIDEO discs) may use various known information compression algorithms, such as MPEG-2 for video compression/decompression. A DVD may also include high fidelity sound as well. In addition, a DVD may also store uncompressed linear pulse code modulated data streams which have sample rates between 48–96 kHertz and are sampled at 16 or 24 bits. Still other DVD versions (hereinafter called DVD-ROM discs) can store digital data for computer use, and the data may also be compressed on these discs.

Although DVD-ROM and DVD-VIDEO discs share compression algorithms, the data format on DVD-VIDEO discs is significantly different than the data format found on DVD-ROM discs. One important difference is that the data content on DVD-ROM is platform-specific, while DVD-VIDEO discs operate with a platform independent navigation engine for playing interactive movies. This navigation engine requires that the files on the DVD_VIDEO disc be referenced in predetermined directory structure.

In particular, each DVD-VIDEO disc contains a main directory denoted as a VIDEO_TS directory which contains two types of files distinguished with the file extensions .IFO and .VOB. During playback, these files are sorted by a DVD video player to form video "title" sets, which are groupings of all files necessary to play a particular DVD video "title", for example, a movie. Each video title set is composed of one .IFO file and one or more .VOB files.

A file with the .VOB extension contains the actual multimedia data and is called a video object set. The location and format of the multimedia data stored in the video object set is defined by the associated .IFO file. In particular, .IFO files contain navigational data structures and a processor-independent interpreted language which specifies how the data structures are arranged.

The data structures themselves are composed of various objects called "program chain objects", "program objects", and "cell objects". Program chain objects link related program objects (or particular scenes) within a title and their data structures govern the playback of the program objects. For example, a simple title may contain only one program chain. However, complex titles may contain two or more program chains to allow random access to a variety of programs. The multiple program chain title can play programs linearly, randomly or in a "shuffle" mode. Program chains allow a particular program sequence to be changed during playback. Thus, it is possible to change the program contact based on stored information. This type of operation is used in implementing "parental control" levels in which information content which parents might find inappropriate (such as extremely violent or sexual material) can be removed from a playback and other material substituted without requiring several separate and complete programs.

Each program object in a program chain is composed of elements called "cell objects". These objects instruct a DVD player which portion of the multimedia data in one of the .VOB files to decode. In particular, the data structures in a cell object are defined in the .IFO file and the multimedia content is found in one of the .VOB files. Each cell object directs the DVD player to begin playback at a specific location in the .VOB file which is referred to as a video object unit or "VOBU". A VOBU is a container object that includes both multimedia data and playback program commands. More specifically, each VOBU may contain a header or navigation pack called an "NV_PACK" that, in turn, contains navigational commands, user operation data and "highlight" commands which control the presentation of the information on the display.

The specific program commands which are recognized by a DVD player are controlled by a device independent language and a set of DVD player parameters which define the current state of the DVD player. These commands cause the DVD player to perform a number of operations, such as generating menu controls at specific locations on the display screen. In order to process these commands a DVD player system typically includes a processor and associated memory (which may be part of the player or a separate computer) and display device. Preferably, the player system is controlled by a playback program running under an operating system such as WINDOWS NT® or OS/2®.

Navigational input can also be obtained directly from a user by means of navigational buttons which are displayed on-screen, along with the multimedia data, under playback program control. The playback program controls both the time duration that the button appears on the screen and the manner in which the system responds to the selection of a button by a user. For example, user selection of a button may cause the playback program to jump to a new location on the disc and begin playback at the new location.

Buttons are typically displayed within a subpicture area of the video display. That is, a video processor typically combines subpicture information with video information to produce a video output having an "overlay" of subpicture information. Subpicture bit stream information will include contrast information which indicates the "mixing level" to use with the video and subpicture information. For example, a subpicture contrast value of 0% typically indicates that the associated picture area should be entirely video information, with no contribution from the subpicture value. On the other hand, a subpicture pixel having a contrast value of 100% will obscure video information associated with the same pixel. A 50% contrast level yields a display having equal contributions from video and subpicture information. Contrast values typically range between 0 and 100% in several steps.

A DVD system provides both subpicture and highlight information in one of four pixel types: Background, Pattern, Emphasis 1, or Emphasis 2, with each pixel type typically having its own associated color and contrast value. Therefore, a subpicture, including such highlight information as navigational buttons displayed within the subpicture, is typically limited to four color and contrast combinations. Each of the pixel types to be displayed within a subpicture is associated with a color palette entry that includes color and contrast information selected from broad range of color and contrast values. For example, a color palette may have sixteen entries available, with each entry including four bytes of information. The four bytes of information could be organized as three bytes of color information and one byte of contrast information, yielding a color palette which selects sixteen color and contrast combinations from approximately seventeen million ($2^{24}$) color values and two hundred fifty six contrast values.

Each of the sixteen color palette entries may be thought of as the contents of a two-byte wide memory location corresponding to one of sixteen color palette addresses. As is known in the art, the addresses may conform to any of a variety of addressing schemes such as direct addressing, indirect addressing, indirect offset addressing, etc, and each color palette address corresponds to one of four pixel values which, in combination, "fill in" the subpicture bitmap. Bitmap pixel values are combined with color palette information to assign color/contrast values to each subpicture pixel location without writing the entire two-byte color/contrast values into each bitmap location. That is, if each pixel value occupies only a nibble, and each color/contrast value requires four bytes for storage, the memory required to store a color bitmap is thereby reduced by a factor of four to one by storing pixel values rather than color/contrast values, for each pixel location. Since DVD subpicture information is limited to the four pixel types denoted above, only four of the sixteen available color palette addresses is employed to display subpicture information.

In some cases, having only four color/contrast combinations for a given subpicture exacts no performance penalty. For example, suppose a subpicture includes two buttons, one for selection of English language closed-captioning, and one for Spanish language closed-captioning. Assume further that the pixels which compose the display pattern for the English language option are all assigned a DVD "Pattern" pixel type, the pixels for the Spanish language option are assigned an "Emphasis 1" pixel type, and the remainder of pixels within the subpicture are assigned a Background pixel type. If the color palette entry associated with the Pattern pixel type produces a blue color with 50% contrast, the English option will be displayed as a blue overlay on the video background with the video background "showing through" as half the pixel information. In order to highlight the English option, when a user selects that option via remote control for example, the color palette entry corresponding to the "Pattern" pixel type could be updated to contain the same, blue color, but with a 100% contrast value. Since the 100% contrast value indicates that the Pattern pixels should completely obscure the video information which "shares" pixel locations with the English language option, the word "English" would be accented on the display.

However, should other pixels, e.g., those that comprise the Spanish language option, within the subpicture be assigned the "Pattern" pixel type, those pixels would be accented, or highlighted, as well. Consequently, if there were more options, or buttons, to display within the subpicture and the associated button pixels were also assigned the "Pattern" type, those pixels would inadvertently be accented along with the English button. Accenting the other pixels in this manner would present a display with more than one option accented, thereby defeating the purpose of highlighting, and confusing a DVD user.

Given the limited number of pixel types available for display within a DVD subpicture, and the desirability of highlighting one of a plurality of display areas without necessarily highlighting all of them, it would therefore be highly desirable to provide a system which permits the modification of the color and contrast values associated with only a portion of the pixels assigned a given subpicture type.

SUMMARY OF THE INVENTION

The foregoing need is satisfied in an illustrative embodiment of the present invention in which a display processor includes a color palette that supports more than n color/contrast values, where n is the number of pre-defined pixel values within an associated display system. In an illustrative DVD display processor embodiment, a DVD display processor includes a color palette that supports more than the four color/contrast values pre-defined for DVD systems. A subpicture bitmap is composed of subpicture pixel values, each of which corresponds to one of the four DVD subpicture pixel types: Background, Pattern, Emphasis 1, and Emphasis 2. The color palette relates a color/contrast combination to each of the subpicture pixel values, with each pixel value operating as an index into a separate color palette location which contains the color/contrast value for a subpicture pixel type. In order to modify the color/contrast value of only a portion of the pixels having one of the four DVD subpicture pixel types, the display processor updates the color palette, associating new color/contrast values with previously "unused" color palette locations. Pixel values within the bitmap locations that are to have their color/contrast values changed are modified to correspond with the address of the color palette location containing the updated color/contrast value. The display processor sends the updated color palette and bitmap to a video processor which combines the color palette information and bitmap information to create an accented, or highlighted subpicture segment. The accented subpicture is then combined with video information to create color values, typically red, green, and blue, for color display. In order to return to the original subpicture display, the original bitmap and color palette are restored. In the illustrative embodiment of the invention, the original bitmap and color palette are stored within the display processors local memory, then written out to the video processor in order to restore the original subpicture. Although, in the illustrative embodiment, color and contrast information are contained within the same color palette, separate mechanisms may be employed to control color and contrast values separately. Although reference will be made to color/contrast combinations, the invention contemplates embodiments where contrast information is under separate control, or is simply given a fixed value.

Overwriting the subpicture bitmap and updating the subpicture color palette in this manner is particularly useful, for example, in accenting a subpicture segment or in removing an accented segment from a subpicture. Additional applications will be apparent to those familiar with the art.

BRIEF DESCRIPTION OF THE DRAWINGS

The above and other features, objects and advantages of the invention will be better understood by referring to the following detailed description in conjunction with the accompanying drawing in which.

DETAILED DESCRIPTION

Figure 1:
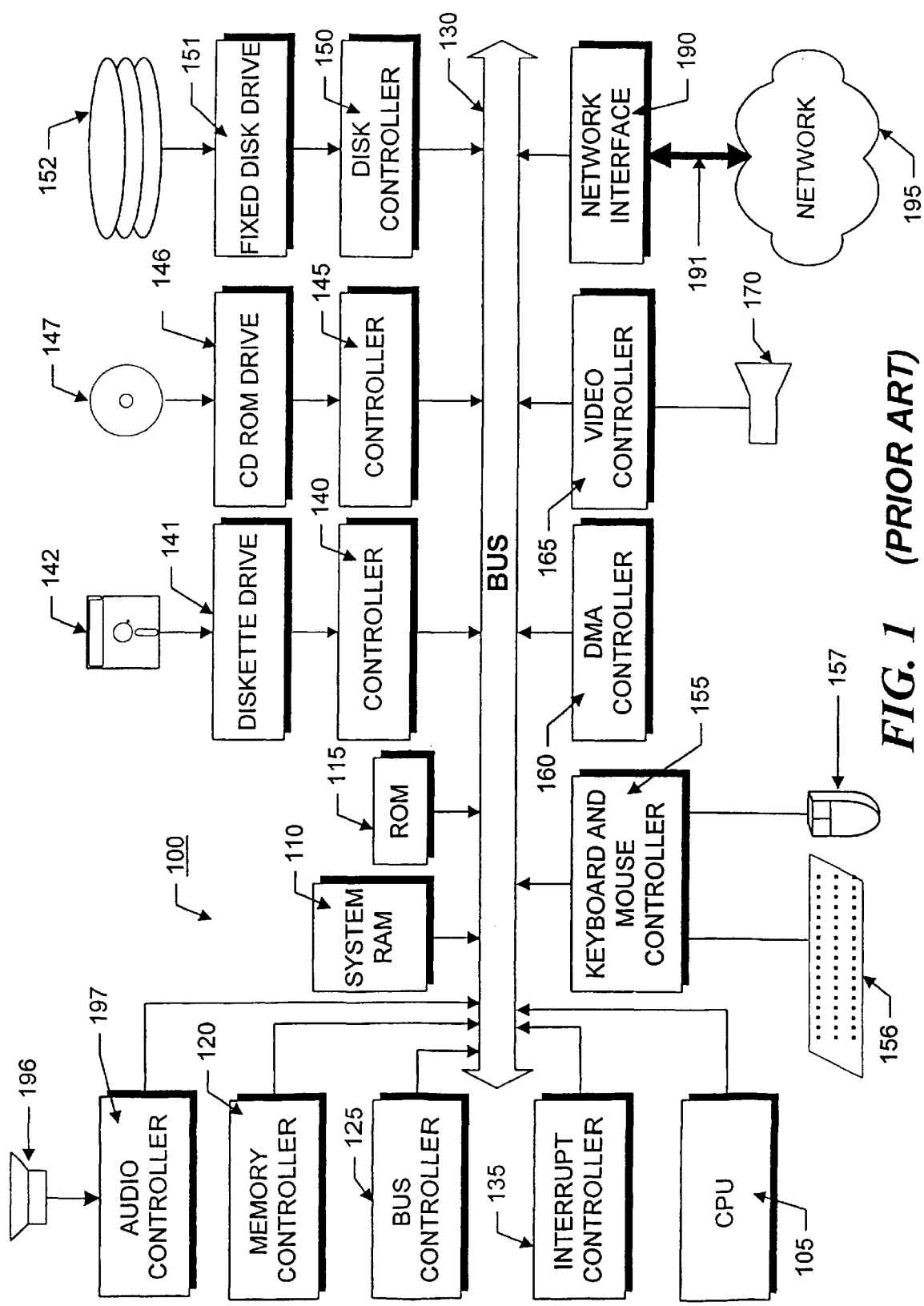
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as an IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disc 152 is part of a fixed disc drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of the computer system 100 is generally controlled and coordinated by operating system software, such as the OS/2® operating system, available from International Business Machines Corporation, Boca Raton, Fla. The operating system controls the allocation of system resources and performs tasks such as processing, scheduling, memory management, networking, and I/O services, among other things. In particular, an operating system resident in system memory and running on CPU 105 coordinates the operation of the other elements of computer system 100. The present invention may be implemented with any of a number of commercially available operating systems, including OS/2, UNIX, and DOS, etc. One or more applications such as Lotus Notes, commercially available from Lotus Development Corp., Cambridge, Mass., may execute on the computer system 100. If the operating system is a true multitasking operating system, such as OS/2, multiple applications may execute simultaneously.

Figure 2:
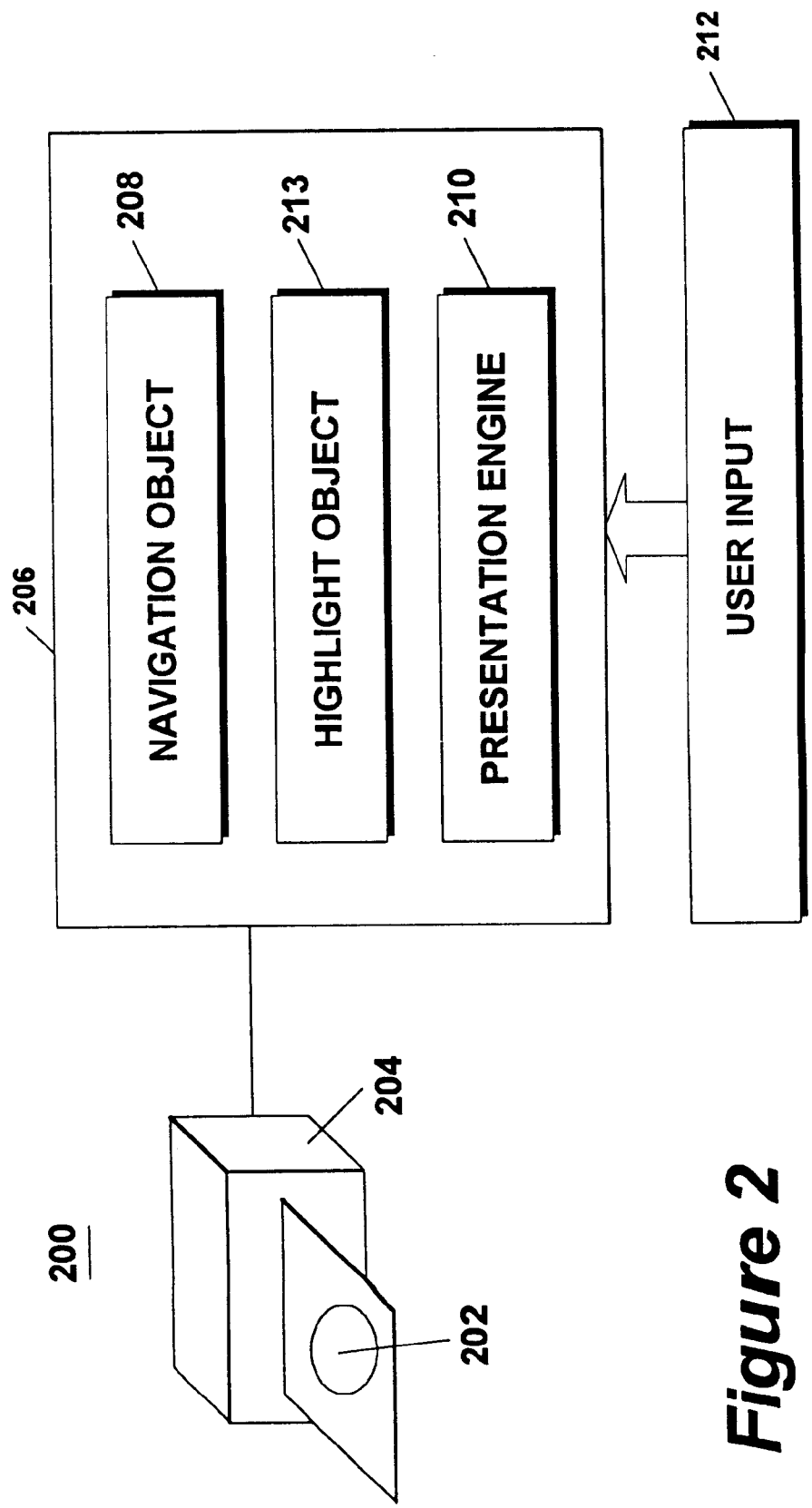
FIG. 2 is a conceptual diagram of the elements comprising a DVD system including a DVD drive and an accompanying computer with software components installed therein.

FIG. 2 illustrates conceptually the main components of a system 200 in accordance with the present invention. FIG. 2 shows a DVD-ROM drive 204 connected to a computer 206. Use of the DVD-ROM drive 204 with the computer 206 should not be construed as a limitation of the invention, however, since other DVD systems, such as a DVD-VIDEO systems, may be used with many other types of multimedia devices, including television systems. In addition, the DVD-ROM drive 204 may also be a drive suitable for internal mounting in computer 206.

The DVD drive 204 receives a disc 202 containing compressed and encoded information which has been coded in accordance with the DVD 1.0 Specification for read-only discs and disc 202 preferably contains up to seventeen gigabytes of information. The computer 206 includes a driver (not shown) for enabling the operating system in the computer 206 to control and exchange information with the drive 204. It also includes one or more input devices 212 which receive input from a user.

The computer 206 also includes a control and playback program shown schematically in FIG. 2 as having a navigation object 208 with logic for reading data from the drive. A presentation engine 210 includes decompressing and decoding routines for decoding the information on the disc 202 and routines for formatting the information for display. For example, the audio information may be compressed by means of conventional compression technique known as Dolby® AC-3® compression (also known as "Dolby® Digital" decompression), and video information may be compressed using a compression technique known as MPEG-2 (Moving Picture Experts Group-2).

In an illustrative embodiment, the software elements of system 200 are implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise, objects are destroyed by a special function called a destructor. Objects may be used by using their data, or attributes, and invoking their functions, or methods. When an object is created at runtime, memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which accesses the object's private data. The public functions form a controlled and consistent interface between the private data and the "outside" world. Any attempt to write program code which directly accesses the private variables causes the compiler to generate an error during program compilation. The error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

In accordance with the principles of the present invention, the DVD system 200 includes a highlight object 213 which encapsulates highlight information and is used by a highlight thread to process the selection of buttons graphically displayed on a display screen. The buttons may be selected, for example, by user input 212 and are typically located within a subpicture area of the display screen. In order to indicate to a user that a particular button has been activated, buttons are preferably accented in some manner, such as changing the button's contrast value.

Figure 3A:
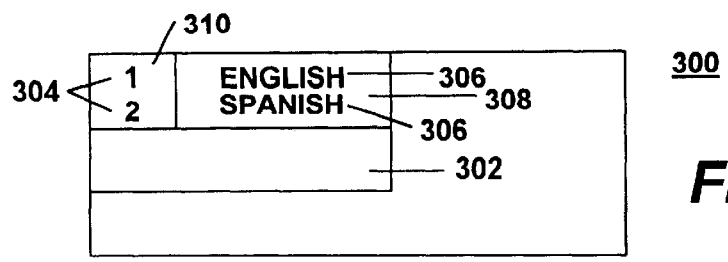
FIG. 3 is a conceptual diagram illustrating a video display having subpicture information displayed thereon.

In FIG. 3A a video display 300 such as the CRT 170 of FIG. 1 includes a subpicture area 302 in which, illustratively, menu options are displayed. The subpicture 302 includes alphanumeric information such as "English" and "Spanish" options and the numerals "1" and "2". In a DVD playback system the pixels within the subpicture area 302 are represented as one of four pixel types: Pattern, Background, Emphasis 1, or Emphasis 2. In this illustrative example, numerical information 304 is assigned a Pattern pixel type, alphabetical characters 306 are assigned Emphasis 1 pixel types, the area 308 surrounding the alphabetical characters 306 is assigned the Background pixel type, and the area 310 immediately surrounding the numerical characters 304 is assigned the Emphasis 2 pixel type.

Figure 3B:
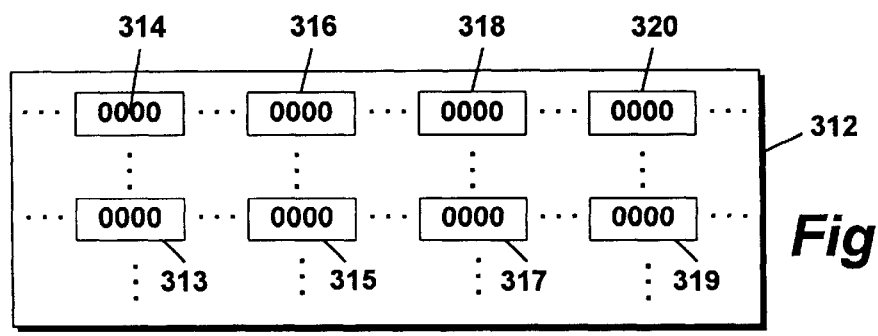

A portion of the bit map 312 associated with the subpicture area 302 is illustrated conceptually in FIG. 3B. The bit map 312 comprises memory locations which typically include color and contrast information, in the form of a color palette address for a pixel, within each nibble of memory. The bitmap 312 is generally arranged in a manner such that display coordinates related to a pixel, that is, the row and column coordinates which locate a pixel within a display 300, are mapped to a specific location within the memory which houses the bitmap 312.

For example, traversing the subpicture area 302 within the display 300 from left to right, approximately on a level with the numeral 1, one would encounter pixels 310 which form the backdrop for the numerals 304. These pixels have been assigned an Emphasis 2 DVD pixel type and, in this exemplary bitmap representation, they are represented as having the binary pixel value 0000. This pixel value may be stored in a bitmap location, such as nibble 314 of FIG. 3B. Continuing across the subpicture 302, one would eventually encounter pixels which form the numeral 1. These pixels have been assigned a Pattern pixel type, are represented by the pixel value 0011, and may be stored in bitmap location nibble 316. Further to the right in the subpicture 302 lie pixels 308 which form the backdrop for the alphabetical characters 306. Pixels 308 have been assigned a DVD Background pixel type and are represented by the pixel value 0001, as stored in bitmap location 318. Finally, one would eventually encounter pixels which form the alphabetical characters 306, which have been assigned an Emphasis 1 DVD pixel type, and may be represented by the pixel value 0010 located in nibble 320.

Similarly, traversing the subpicture at a lower level, in line with the numeral "2" for example, one would encounter pixels having the same DVD pixel types, corresponding to numerical backdrop, numerical, alphabetical backdrop, and alphabetical pixels that are represented by nibbles 313, 315, 317, and 319, having the pixel values 0000, 0011, 0001, and 0010, respectively. As indicated by the ellipses within the bitmap, many pixel values may lie between pixels such as pixels 314 and 316 or pixels 314 and 313.

Figure 3C:
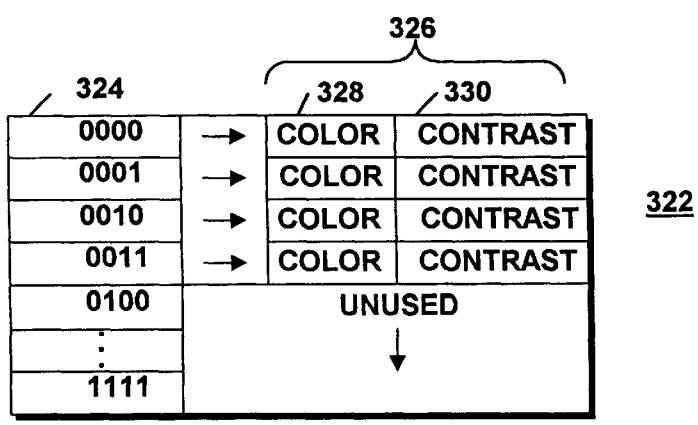

A color palette 322, illustrated conceptually in FIG. 3C, operates in conjunction with the pixel values stored within the bitmap 312 to provide color and contrast values for each of the subpicture pixels. The color palette 322 includes, illustratively, a column of sixteen four-bit values 324 which correspond to the addresses of sixteen locations within the color palette 322. Each of the addresses points to the contents of one of sixteen corresponding four-byte locations, represented by column 326. The contents of each of the four-byte locations may be illustratively divided into a three-byte segment 328 which represents color information and a one-byte segment 330 which represents contrast information. This division permits the contents of each of the four-byte locations to represent one of $2^{24}$ color values and one of 256 contrast values. However, as noted above, the contrast values may range from 0% to 100%, in sixteen steps in this example, with 100% contrast indicating that the corresponding subpicture pixel value should obscure video information at the corresponding location on the screen 300.

With the four DVD pixel types each assigned a pixel value as noted above, that is, with the DVD Emphasis 2 pixel type assigned the pixel value 0000, the DVD Background pixel type assigned the pixel value 0001, the DVD Emphasis 1 pixel type assigned the pixel value 0010, and the DVD Pattern pixel type assigned the pixel value 0011, the contents of the first four four-byte color/contrast locations 326 could provide the four color/contrast values for the four DVD pixel types. Any of the $2^{24}$ color and 16 contrast values would be available to each of the DVD pixel types. Color/contrast combinations could be repeated. For example, pixel values may be differentiated merely by differences in contrast values. Alternatively, both color and contrast values may differ from pixel type to pixel type. The contents of the twelve locations within the color palette 322 above location 0011 are, for now, unused.

In operation, four-byte color/contrast values are loaded into locations 326 to correspond to DVD pixel values which correspond to color palette addresses 324. Typically, the color palette 322 is loaded by a display processor through a bus, such as bus 130 in FIG. 1. In this manner, although only four color/contrast values are associated with the subpicture pixel value at a given time, those four values are chosen from $2^{24}$ possible colors and 16 possible contrast values. The bit map 312 and color palette 322 are typically located within a video controller such as video controller 165 of FIG. 1. Should a user scroll to one of the option locations displayed on the screen 300, the highlight object 213 may be used to change the appearance of the display, accenting a button for example, to thereby indicate to a user which of the displayed options he has chosen.

With all four DVD pixel types assigned to pixels within the subpicture 312, invocation of a highlight object 213 method typically would not, for example, modify the contents of color palette location 0010 to change the color/contrast value of the Emphasis 1 "English" button pixels, without also changing the value of the Emphasis 1 "Spanish" button pixels and changing the value of both the "English" and "Spanish" pixels would defeat the purpose of changing pixel values. That is, neither option would be visually set apart if both options' pixels were accented. Rather than simply updating the color palette, in accordance with the principles of the present invention, the DVD display processor 332 updates both the bitmap 312 and the color palette 322 to permit, illustratively, the accentuation of one of a group of displayed language option buttons, as will be described in greater detail in relation to FIG. 4.

Figure 4:
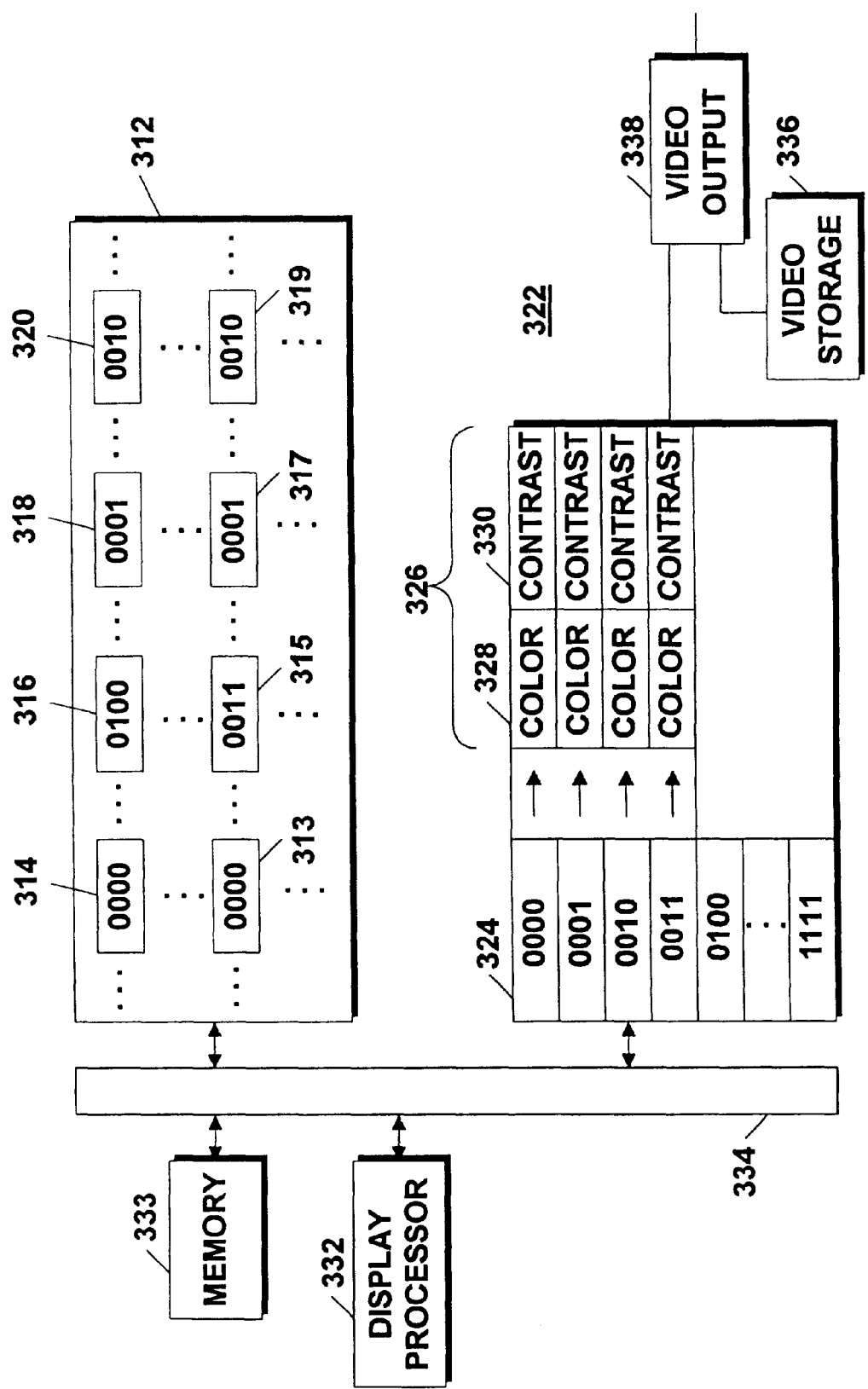
FIG. 4 is a conceptual block diagram illustrating a subpicture bitmap, a color palette and other DVD display components.

In FIG. 4 the bit map 312 and color palette 322 have been updated in accordance with the principles of the present invention in order to accent one of the language buttons of FIG. 3. Bit map locations corresponding to pixels that are to be changed are overwritten with new pixel values that correspond to the addresses of formerly unused locations within the color palette. The content of those color palette locations are updated to contain the color/contrast combinations desired for the updated pixels.

In the example of FIG. 4, nibble 316 has been updated from a value of 0011 to 0100. Additionally, although it represents a pixel within numeral "2" and therefore corresponds to the same DVD pixel type as nibble 316, nibble 315 retains the same assigned value it had in FIG. 3. The utility of this approach may be seen if one recalls that nibble 316 corresponds to a pixel within the numeral "1" and assumes that a user has moved an on-screen cursor to numeral "1", through the user input 212, for example. In response to the cursor movement, the highlight object 213 is used to accent numeral "1" on-screen. Because only four color palette locations 326, corresponding to the four DVD pixel types, have been used in the original color palette assignments of FIG. 3, the twelve remaining, originally undefined, locations within the color palette 326 are available for new pixel value definitions. The contents of the color palette location having the address 0100 (recall that this binary value may be employed in a variety of ways to address locations within the color palette) may therefore be updated to change the contrast value of the pixel corresponding to nibble 316 of the bitmap, for example. In this manner a nibble 316, which corresponds to an Emphasis 2 pixel, may be updated to a have value 0100, which is, in effect, translated by the color palette 322 into new color and contrast information from the updated 0100 location, while nibble 315, which also corresponds to an Emphasis 2 pixel, remains unchanged, having the color/contrast value loaded in the color palette location having the address 0011.

In order to update a portion of the pixel values having a given pixel type, a display processor 332 copies the bit map 312 into a local memory 333, which may take the form of the system RAM 110 FIG. 1. Additionally, the display processor 332 copies the color palette 322 into local memory 333 and locates unused location within the color palette 326. After copying the bit map 312 and color palette 322 into local memory, the display processor 332 over-writes the bit map copy in those local memory locations that correspond to bitmap locations, such as nibble 316, where a new color and/or contrast is desired. The corresponding location in the color palette 326, that is, the location pointed to by the new bitmap pixel value is loaded with new color and contrast data.

The updated bit map and color palette copies within the local memory 333 are then copied into the bit map 322 and 312 respectively. The updated color palette information and bit map information may be combined, along with video information from a video storage device 336, such as a frame buffer, by video output device 338 in a conventional manner. The combination yields a red/green/blue (RGB) value which may be used, for example, to control the red, green, and blue beam currents of a cathode ray tube display, such as display 170 of FIG. 1. To turn off a button accent, the original bit map and color palette values, illustratively stored within the local memory 333, may be copied into the bitmap 312 and color palette 322 within the video controller.

Figure 5:
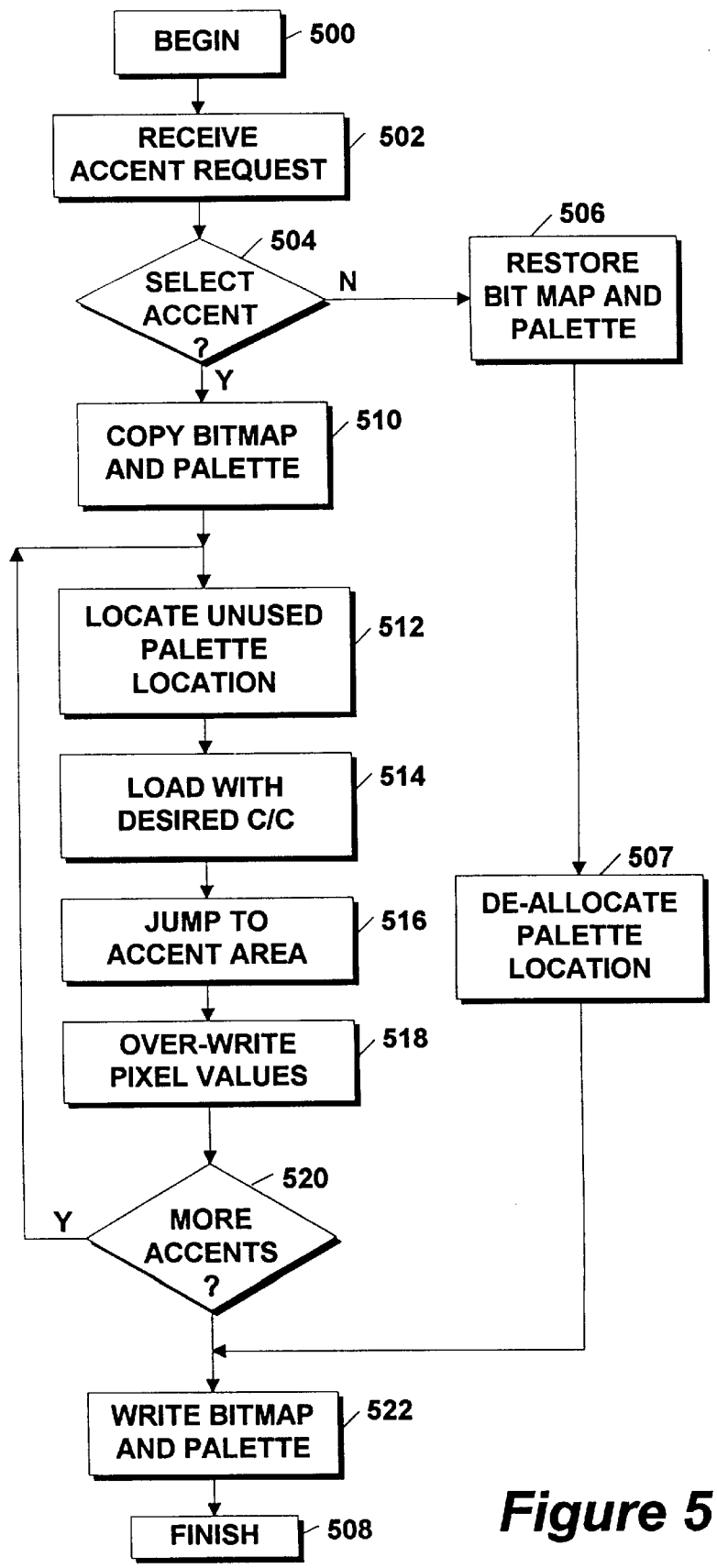
FIG. 5 is a flowchart illustrating the process of changing the color/contrast value of pixel information related to a subpicture, in accordance with the principles of the invention.

The process of providing additional color/contrast combinations for display, while working within the constraints of a relatively limited set of pixel types, such as the four types established for DVD subpicture display, is set forth in greater detail in relation to the flow chart of FIG. 5. Although the illustrative example is set forth in terms of a request for accenting a particular area of a subpicture, the process is general and may be applied to the provision of color/contrast combinations in a broad variety of applications. The process begins in step 500 and proceeds to step 502, where an "accent request" is received. Typically, the accent request would be handled by the invocation of a method of the highlight object 213, and would be in response to the activation of a user input 212, such as moving a cursor upon the screen 300 to select a button item within a subpicture 302. The process proceeds from step 502 to step 504 where it is determined whether an accent is to be selected or "de-selected", i.e., whether an accent is to be turned on or off for the area of interest. If the accent is to be turned off, the process proceeds to step 506, where the original, non-accented, bitmap and palette are restored. From step 506 the process proceeds to step 507, where any location within the palette that was used for accenting is de-allocated so that it may be used for another accenting. From step 507 the process proceeds to step 522, where the updated bitmap and color palette copies, the restored originals in this case, are written into the actual bitmap 312 and color palette 322.

On the other hand, should it be determined in step 504 that a subpicture area of interest is to be accented, the process proceeds from step 504 to step 510 where the current subpicture bitmap 312 and color palette 322 are copied into local memory. From step 510 the process proceeds to step 512, where an unused color palette location is found. This will typically be a location for which the contents have previously been undefined. The process then proceeds to step 514, where the unused location is loaded with a desired color/contrast value. As noted in the discussion related to FIGS. 3 and 4, the pixel values of each subpicture pixel location within the bitmap may correspond to both a DVD pixel type and a color palette address. In this way, a pixel value within a bitmap maps a DVD pixel type to the color/contrast value held within color palette location having the address of the pixel value. Consequently, the bitmap locations corresponding to the accented button area may be loaded with a new pixel value corresponding to the color palette address of the new color/contrast value in order to map new color/contrast values to the pixels of interest.

To this end, the process proceeds to step 516, where the process locates the button area that is to be accented within the copy of the subpicture bitmap within local memory. Once the button area is located within the bitmap copy, the process proceeds to step 518, where the button area is over-written with new pixel values. Illustratively, the new pixel values correspond to the color palette address of the updated color/contrast entry. When all the pixels within the button area of interest are overwritten in this fashion, the process proceeds to step 520, where it is determined whether more accents are desired. That is, the process determines, for example whether additional subpicture buttons should be adjusted. The adjustment of additional subpicture buttons may be employed to amplify the accentuation of the first button, for example.

If more accents are desired, the process proceeds to step 512 and from there as previously described. On the other hand, if no more accents are desired, the process proceeds from step 520 to step 522 where the updated bitmap and color palette copies are written into the actual bitmap 312 and color palette 322. As noted above, the bitmap 312 and color palette 322 are typically located within a video controller 165. The process then proceeds to finish in step 508. Additional copies of the original color palette 322 and subpicture bitmap 312 may be stored within local memory 333 and used to restore the original button display. That is, in order to "de-accent" a button, the original bitmap and color palette values may be written from unmodified copies stored in local memory 333 to the bitmap 312 and color palette 322.

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be reliably substituted. Further, the methods of the invention may be achieved in either all software implementations, using the appropriate processor instructions, or in hybrid implementations which utilize a combination of hardware logic and software logic to achieve the same results. Hardware implementations may include a microprocessor in combination with various support circuitry, a single-chip microcontroller, hybrid circuits which employ packaging techniques other than plastic- or ceramic-encapsulated packaging, or application specific integrated circuits (ASICs). The ASICs may take the form of gate arrays, structured cell arrays, or full custom integrated circuits, for example. Color and contrast information may be stored within a single color palette, or color the system may employ separate mechanisms for controlling color and contrast information. Further, aspects such as the size of memory, number of bits utilized to represent datum or a signal, data word size, the number of clock cycles necessary to execute an instruction, and the specific configuration of logic and/or instructions utilized to achieve a particular function, as well as other modifications to the inventive concept are intended to be covered by the appended claims.

What is claimed is:

1. A computer program product for displaying DVD highlight and button information in a digital versatile disc system, the computer program product comprising a computer usable medium having computer readable program code thereon, comprising:

program code for creating a pixel bitmap and for loading each location within the bitmap with a pixel value corresponding to one of four DVD pixel types including Pattern, Background, Emphasis 1, or Emphasis 2, program code for creating a color palette capable of storing at least five color/contrast combinations within locations indicated by color palette addresses, each pixel value corresponding to an address within the color palette, program code for modifying some, but not all, of the pixel values within selected bitmap locations associated with a single DVD pixel type to a new pixel value which is not one of the four DVD pixel types, and program code for loading color/contrast values to a location within the color palette, the address of the color palette location corresponding to the new pixel value within the selected bitmap locations.

2. The computer program product of claim 1 further comprising program code operable before the modifying program code modifies the pixel values within the selected bitmap locations for storing the addresses and associated color and contrast values of the color palette and for storing the pixel values associated with the bitmap.

3. The computer program product of claim 2 further comprising program code for restoring an unmodified state of the color palette by writing the stored color/contrast values into the color palette and writing the stored pixel values into the bitmap.

4. The computer program product of claim 1 further comprising program code for modifying a contrast value within a color palette location to thereby accent a subpicture button.

5. The computer program product of claim 1 further comprising program code for modifying a color value within a color palette location to thereby accent a subpicture button and for over-writing an area within the bitmap corresponding to a subpicture button.

6. A method for efficiently modifying sub-picture data in a digital versatile disc system wherein the sub-picture data is a pixel bitmap having a plurality of locations, each location holding a pixel value selected from a fixed set of values specified by a standard governing the digital versatile disc system, each pixel value referencing a location in a color palette which location holds a display code specifying a display at the bitmap location, the method comprising:

(a) changing selected bitmap locations holding a first pixel value to a second pixel value which is not in the fixed set of values and which references a new location in the color palette not referenced by any value in the fixed set of values, and (b) loading a display code to the new color palette location in order to change the display at the selected bitmap locations without changing the display at any of the other bitmap locations.

7. The method of claim 6 further comprising before step (a), storing the pixel bitmap and the color palette in a memory.

8. The method of claim 6 further comprising:

(c) retrieving copies of the pixel bitmap and the color palette from the memory and using the retrieved copies to overwrite the pixel bitmap and the color palette in order to reverse the modifications produced by steps (a) and (b).

9. The method of claim 8 further comprising:

(d) releasing the new color palette location after the modifications produced by steps (a) and (b) have been reversed.

10. The method of claim 6 wherein the selected bitmap locations comprise some, but not all, of the bitmap locations holding the first pixel value.

11. The method of claim 6 wherein the fixed set of pixel values comprises four pixel values.

12. The method of claim 6 wherein each pixel value is four bits in length.

13. The method of claim 6 wherein the display code comprises color and contrast information.

14. The method of claim 13 further comprising combining the color and contrast information with picture data in the digital versatile disc system.

15. Apparatus for efficiently modifying sub-picture data in a digital versatile disc system wherein the sub-picture data is a pixel bitmap having a plurality of locations, each location holding a pixel value selected from a fixed set of values specified by a standard governing the digital versatile disc system, each pixel value referencing a location in a color palette which location holds a display code specifying a display at the bitmap location, the apparatus comprising:

a first display processor which changes selected bitmap locations holding a first pixel value to a second pixel value which is not in the fixed set of values and which references a new location in the color palette not referenced by any value in the fixed set of values, and a second display processor which loads a display code to the new color palette location in order to change the display at the selected bitmap locations without changing the display at any of the other bitmap locations.

16. The apparatus of claim 15 wherein the first display processor comprises a mechanism which stores the pixel bitmap and the color palette in a memory before changing selected bitmap locations.

17. The apparatus of claim 16 wherein the first display processor comprises a retrieval mechanism which retrieves copies of the pixel bitmap and the color palette from the memory and uses the retrieved copies to overwrite the pixel bitmap and the color palette in order to reverse the modifications produced by changing the bitmap locations.

18. The apparatus of claim 17 wherein the second display processor comprises a mechanism which releases the new color palette location after the retrieval mechanism reverses the modifications.

19. The apparatus of claim 15 wherein the selected bitmap locations comprise some, but not all, of the bitmap locations holding the first pixel value.

20. The apparatus of claim 15 wherein the fixed set of pixel values comprises four pixel values.

21. The apparatus of claim 15 wherein each pixel value is four bits in length.

22. The apparatus of claim 15 wherein the display code comprises color and contrast information.

* * * * *